United States Patent Office 2,745,626
Patented May 15, 1956

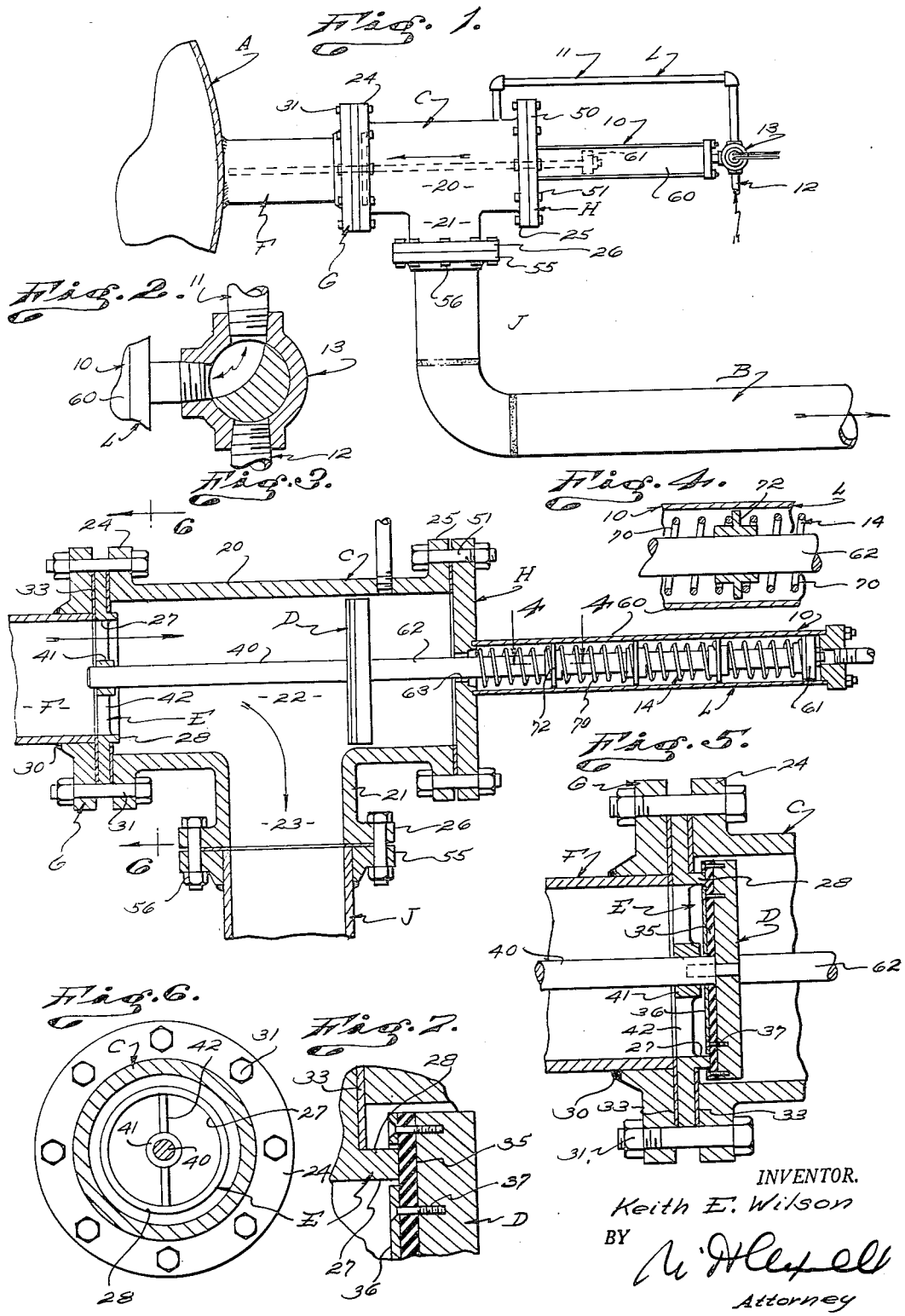

2,745,626

PILOT CONTROLLED VALVE FOR SUB-ATMOSPHERIC AND OTHER LOW PRESSURES

Keith E. Wilson, Burbank, Calif., assignor to Hieatt Engineering Co., Los Angeles, Calif., a corporation of California Application September 7, 1950, Serial No. 183,614

6 Claims. (Cl. 251—25)

This invention has to do with fluid handling apparatus and is more specifically concerned with apparatus for handling fluids at very low pressures, for example, at sub-atmospheric pressures. A general object of the invention is to provide a structure for controlling or stopping the flow of fluids, which is simple and dependable in operation as well as highly effective and also inexpensive of manufacture.

Another object of this invention is to provide a fluid handling strtucture of the general character referred to through which a fluid such as a gas may flow with a minimum of resistance.

It is another object of this invention to provide fluid or flow handling apparatus in the general nature of a valve mechanism which is normally held open by action of spring means.

Another object of the invention is to provide a fluid handling apparatus of the general character referred to which is closed against spring means that normally holds the structure open, by the introduction of fluid under pressure greater than that being handled by the apparatus.

It is a further object of the invention to provide a fluid handling structure of the general character referred to in which a simple, dependable, inexpensive structure is provided through the provision of few simple parts rendering the apparatus very simple and inexpensive of manufacture.

The structure in which the invention is involved includes a body, preferably T-shaped in formation, so that it has an elongate main portion defining a chamber and a laterally projecting portion defining a flow passage that communicates with the chamber. Flanges are provided at the extremities of the various body parts. A seat is provided at one end of the body and is preferably a round plate with a central opening and it has an inwardly projecting seat ridge. A coupling flange suitable for carrying a pipe or duct is secured to the flange at the end of the body where the seat occurs and is secured to such body flange so the seat is clamped in operating position. A valve, preferably a simple, round, plate or disc is operable in the main portion of the body between a closed position, engaging the seat ridge and an open position in the end portion of the body remote from that where the seat occurs. A sealing element is carried on the valve at the face opposing the seat and is secured in place by suitable retainers. A closure or head closes the end of the main portion of the body remote from the seat. Operating means for the valve involves a cylinder and piston mechanism carried by or projecting from the head and a rod is attached to the piston of said mechanism and extends through the head to carry the valve which is located in the main portion of the body. Spring means, preferably a series of helical springs guided by spacers occurs in the cylinder and normally yieldingly urges the piston outwardly in the cylinder. A fluid handling system is provided for operating the piston in the cylinder and in a preferred form involves a low pressure line connected into the outer end of the cylinder through a control valve and a high pressure line connected with the outer end of the cylinder through the control valve. The low pressure line is in communication with the interior of the body while the high pressure line may be open to atmosphere. The control valve is a three-way valve operable between a position where it puts the low pressure line in communication with the cylinder and a position where it puts the high pressure line in communication with the cylinder.

The various objects and features of my invention will be fully understood from the following detailed description of a typical preferred form and application of my invention, throughout which description reference is made to the accompanying drawings, in which:

Fig. 1 is a general view of the apparatus provided by the present invention. Fig. 2 is an enlarged detailed sectional view through the control valve of the operating means. Fig. 3 is an enlarged central or longitudinal sectional view through the body and the cylinder and piston mechanism showing the valve located in the body in an open position. Fig. 4 is an enlarged detailed sectional view of a portion of the mechanism, being a view taken substantially as indicated by line 4—4 on Fig. 3. Fig. 5 is an enlarged detailed sectional view taken at the seat end of the body and showing the valve in closed position. Fig. 6 is a transverse sectional view taken as indicated by line 6—6 on Fig. 3 and Fig. 7 is an enlarged detailed view of a portion of the structure shown in Fig. 5.

The structure in which the present invention is embodied may be operated or used in connection with various structures or devices. In the case illustrated in the drawings and which may be considered typical the apparatus is combined with a vessel A and a suction or exhaust line B. The structure is particularly practical for handling gas or gases and it is to be understood that I mean to include air as being within the term gas or gases, as used throughout this specification and in the claims. The vessel A may be of any size, shape or type and for any purpose, and as an example it may be a vessel designed to be exhausted or practically exhausted of gases. The suction or exhaust line B may be connected with a pump or any other suitable means serving to draw gases from the vessel A.

In the typical application of the invention shown in the drawings there is a body C carrying a valve element D and a seat element E. The body C is coupled with the vessel A through a duct F and a flange G. The body is closed by a head H. A lateral projection of the body is joined with the suction line B by a duct J. Operating means L is shown as involving a cylinder and piston mechanism 10, a low pressure line 11, a high pressure line 12, an electrically operated control valve 13 and spring means 14 carried in mechanism 10.

The body C of the apparatus is preferably T-shaped in general configuration so that it has an elongate main portion 20 and a laterally projecting portion 21. The main portion 20 of the body defines a chamber 22 which is round in cross section and extends from one end of portion 20 to the other. The lateral portion 21 of the body defines a flow passage 23 in communication with the chamber 22 at a point about midway between the ends thereof. The body is provided with flanges at its extremities or terminal portions, for instance, there is a flange 24 at one end of the body portion 20, a flange 25 at the other end of the body portion 20, and a flange 26 at the outer end of the body portion 21.

The seat E as provided by the present invention is preferably in the form of a simple flat round plate seated on or engaged with the flange 24 and having a central gas opening or passage 27 formed therethrough. The seat plate has an annular seat ridge 28 projecting from the inner side or face thereof and surrounding the opening 27. The seat is held in place on or against the flange 24 by means of flange G which is a coupling flange serving to couple the duct F with the body C. In the case illustrated the flange G is joined to the duct F by welding 30. The flange G is releasably secured to flange 24 of the body by an annular series of releasable fasteners or bolts 31. In practice it is desirable to provide washer-like seals or gaskets 33 at opposite sides of the seat so that leak-proof connections are maintained between the seat and the flanges between which the seat is held.

The valve element D is preferably a simple round plate carried in the main portion 20 of body C to be freely movable lengthwise in the chamber 22 between a closed position where it engages the seat E as shown in Figs. 5 and 7, and an open or retracted position where it is in the end portion of the body remote from the seat and beyond the lateral portion 21 as shown in Fig. 3. The valve element D is preferably provided at the face which opposes the seat with a sealing member or element 35 which may in practice be a sheet or body of suitable packing or sealing material, such as rubber, or the like. In the case illustrated the sealing element is shown secured to the face of the valve that opposes the seat by retainers 36 secured to the valve by screw fasteners 37, the retainers being shaped and proportioned to effectively hold the sealing element leaving an annular part thereof exposed to cooperate with the seat ridge 28.

In the preferred form of the invention a guide stem 40 is joined to the valve element D centrally thereof and projects toward the seat E where it is slidably supported in a guide 41 located centrally in the seat opening 27. The guide is preferably carried by ribs or webs 42 and the guide stem 40 is of such length as to remain engaged in the guide 41 throughout operation of the valve D.

A head 50 closes the end of body C remote from the seat and in the case illustrated is shown as a simple closure or plate secured to flange 25 by suitable fasteners or bolts 51.

The duct J establishing connection between the body and the exhaust line B is preferably joined to the body through the laterally projecting portion 21 thereof. In the case illustrated the duct J is shown joined to the lateral projection 21 of the body through a flange 55 on the duct secured to flange 26 of the body by suitable fasteners 56.

The operating means L involves, generally, the cylinder and piston mechanism, high and low pressure lines, control valve and spring means hereinabove referred to.

The cylinder and piston mechanism 10 of means L is preferably mounted on or carried by the head 50 so that it is coaxial with the body portion 20. The cylinder 60 of the mechanism 10 is fixed to the head 50 and projects outwardly therefrom while the piston 61 is slidably carried in the cylinder 60. A piston rod 62 is attached to piston 61, extends through an opening 63 in the head 50 and is attached to the valve element D. The cylinder 60 is of such length that as the piston 61 operates in the cylinder between its inner and outer end portions the valve D is operated between the two positions hereinabove described.

The spring means 14 is preferably located within the cylinder and acts upon the piston 61 to normally yieldingly urge it outwardly in the cylinder or to a position such as is shown in Fig. 3 of the drawings. In the preferred construction the means 14 involves a plurality of helical springs 70 surrounding the piston rod 62 and located within the cylinder 60 between the head 50 and the piston 61. The springs 70 are helical compression springs and are in end to end relation, being spaced apart and guided by suitable guide members 72 located on the piston rod. See Fig. 4 of the drawings.

The low pressure line 11 preferably connects the outer end of cylinder 60 with a part of the apparatus where low pressure is maintained. In the case illustrated the line 11 connects the chamber 22 of body C with the outer end of the cylinder, the connection being made through the control valve 13. The high pressure line 12 connects the outer end of cylinder 60 with a suitable source of pressure. When the mechanism is being operated at sub-atmospheric pressures the high pressure line 12 may be simply open to atmosphere.

The control valve 13 that connects the lines 11 and 12 to the outer end of the cylinder 60 is preferably an electrically operated three way valve of the general type illustrated in Fig. 2 of the drawings, from which it will be apparent that the valve can be operated to either of two positions. When in one position the valve 13 connects line 11 with cylinder 60 and when in the other position it connects line 12 with cylinder 60. When the line 11 is connected with cylinder 60 through the valve 13 reduced pressure occurs or is maintained on the outer side of piston 61 and this may be balanced with pressure admitted to the inner side of the piston through the opening 63 and the head 50. In such case the spring means 14 is free to move the parts to the position shown in Fig. 3 where the valve element D is fully open, establishnig full, free and open communication between the duct F and the duct J. When the control valve 13 is operated to admit pressure to the outer end of cylinder 60 the action of the spring means 14 is overcome and the valve element is operated to the closed position where it cooperates with the seat E as shown in Fig. 5.

From the foregoing description it will be apparent that I have provided a mechanism involving few simple parts that can be readily manufactured and which are effective and dependable in operation. The apparatus is particularly practical for operation under conditions where very high vacuums are maintained, in which case atmospheric pressure admitted through the high pressure line 12 is so much greater than that maintained in the body and communicated through the line 11 that the action of the apparatus is rapid and dependable. When the apparatus has been operated so the valve element D is closed the vessel A is sealed and the only possible point at which leakage can occur is between the valve element D and the seat E. It is practical to maintain a dependable seal at this point. In the event of leakage at any other point in the apparatus when the valve is closed pressure may increase in the body C but this will merely serve to hold the valve element D in engagement with the seat.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. Apparatus of the character described including, a flanged T-fitting establishing a body with an elongate main portion and a lateral extension open with the body intermediate the ends of the main portion of the body, an annular seat member arranged at one end of the main portion, a duct flange holding the seat member against said end of the body portion, a head on and closing the other end of the main portion, a flat disc shaped valve member adapted to operate longitudinally in the main portion of the body past the said extension and into and out of engagement with the seat, a cylinder carried by and projecting from the head, the cylinder having its inner end in communication with the body, a piston operating in the cylinder and having one side subject to the same pressure as the body, a rod attached to the piston, extending through the head and attached to the valve, a continuous low pressure line extending from the interior of the body to the outer end of the cylinder, a high pressure line independent of the body and extending to the outer end of the cylinder, and valve mean selectively controlling flow between the said lines and the cylinder outward of the piston.

2. Apparatus of the character described including, a body with an elongate main portion and a lateral extension open with the body intermediate the ends of the main portion of the body, an annular seat member arranged at one end of the main portion, a duct flange holding the seat member against said end of the body portion, a head on and closing the other end of the main portion, a flat disc shaped valve member adapted to operate longitudinally in the body past the said extension and into and out of engagement with the seat, a cylinder carried by and projecting from the head and having its inner end in communication with the main portion of the body, a piston operating in the cylinder, a rod attached to the piston and extending through the head with clearance and attached to the valve, spring means in the cylinder inward of the piston and supported by the head and normally yieldingly urging the piston outwardly in the cylinder, a low pressure line extending continuously from the main portion of the body to the outer end of the cylinder, a high pressure line independent of the rod and extending to the outer end of the cylinder, and valve means selectively controlling flow between the said lines and the cylinder outward of the piston.

3. Apparatus of the character described including, a body with an elongate main portion and a lateral extension, a seat member arranged at one end of the main portion, a duct flange holding the seat against the body portion, a head closing the other end of the main portion, a valve operating in the body into and out of engagement with the seat, a cylinder carried by and projecting from the head, a piston operating in the cylinder, a rod attached to the piston, extending through the head and attached to the valve, a low pressure line extending from the body to the outer end of the cylinder, a high pressure line extending to the outer end of the cylinder, valve means selectively controlling flow between the said lines and the cylinder, and spring means including, a plurality of helical compression springs surrounding the rod and arranged in a series between the piston and head and all operable to urge the piston outwardly in the cylinder, and guides around the rod and between the springs.

4. Apparatus adapted to operate in a closed system at subatmospheric pressure including, a flanged T-fitting establishing a body with an elongate main portion and a lateral extension open with the main portion intermediate its ends, an annular plate with a valve seat arranged at one end of the main portion, a duct flange holding the plate against said end of the main portion of the body, a flanged head on and closing the other end of the main portion, a flanged exhaust line secured to the extension, a valve operating in the main portion of the body from one end portion to the other thereof and into and out of engagement with the seat, a cylinder carried by and projecting from the head, a piston operating in the cylinder, a rod attached to the piston, extending through the head and attached to the valve, a low pressure line extending continuously from the body to the outer end of the cylinder, a high pressure line handling atmospheric pressure and extending to the outer end of the cylinder, and valve means selectively controlling flow between the said lines and the cylinder.

5. Apparatus of the character described including, a flanged T-fitting establishing a body with an elongate main portion and a lateral extension, an annular seat member defining a flow passage and arranged at one end of the main portion, a duct flange holding the seat against the body portion, a head closing the other end of the main portion, a valve operating in the body into and out of engagement with the seat, a guide supported by the seat centrally in the flow passage, a stem on the valve projecting from one side thereof and slidably carried in the guide, a cylinder carried by and projecting from the head and having its inner end in communication with the main portion of the body, a piston operating in the cylinder, a rod attached to the piston and projecting from the other side thereof to extend through the head with clearance and attached to the valve, a low pressure line extending from the body to the outer end of the cylinder, a high pressure line carrying pressure in excess of that subjected to the valve and extending to the outer end of the cylinder, and valve means selectively controlling flow between the said lines and the cylinder.

6. A device for use with a closed vessel adapted to contain subatmospheric pressures comprising an inlet duct, an exhaust line adapted to carry pressure below that of the duct, an elongate body defining a chamber with a lateral flow passage intermediate its ends, a seat at one end of the body, a coupling member on the said duct, fastening means connecting the coupling member and body and clamping the seat on one end of the body, means coupling the exhaust line and flow passage, a head closing the other end of the body, a valve in the body adapted to operate longitudinally therein past said flow passage and into and out of engagement with the seat, a cylinder carried by the head and projecting outwardly therefrom and having its inner end open to the chamber, a piston in the cylinder, a rod coupling the piston and valve, spring means in the cylinder normally yieldingly urging the piston outwardly in the cylinder, a low pressure line from the chamber to the cylinder, a high pressure line to the cylinder, and a three way valve selectively controlling flow between the high and low pressure lines and the cylinder.

References Cited in the file of this patent

UNITED STATES PATENTS

| | | |
|---|---|---|
| 338,771 | Noble | Mar. 30, 1886 |
| 564,167 | Thompson | July 14, 1896 |
| 603,043 | McIntosh | Apr. 26, 1898 |
| 616,724 | Noble | Dec. 27, 1898 |
| 798,551 | Willits | Aug. 29, 1905 |
| 1,496,391 | Thomas | June 3, 1924 |
| 1,847,343 | Jackson | Mar. 1, 1932 |
| 1,864,402 | Bodemuller | June 21, 1932 |
| 2,177,099 | Dreyer et al. | Oct. 24, 1939 |
| 2,445,163 | Williamson | July 13, 1948 |
| 2,518,387 | Shaw | Aug. 8, 1950 |

FOREIGN PATENTS

| | | |
|---|---|---|
| 18,584 | Great Britain | Sept. 14, 1899 |